May 31, 1960  L. TAVAN  2,938,291
DISPLAY DEVICE
Filed Oct. 28, 1958
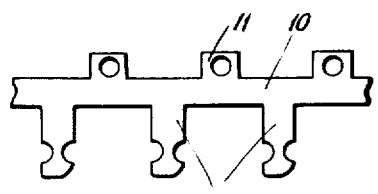
Fig. 2
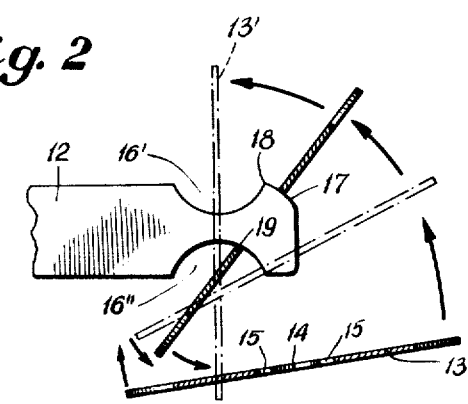
Fig. 7
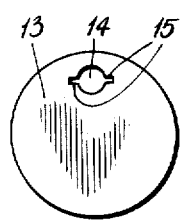
Fig. 3
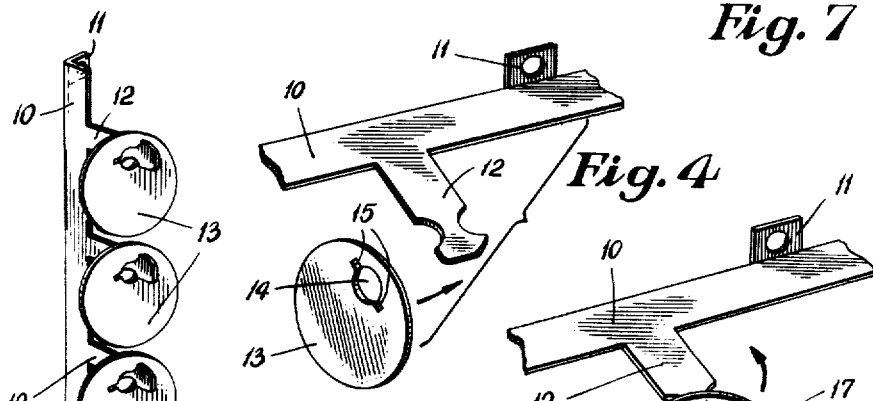
Fig. 4
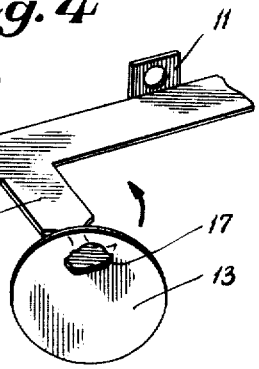
Fig. 5
Fig. 1
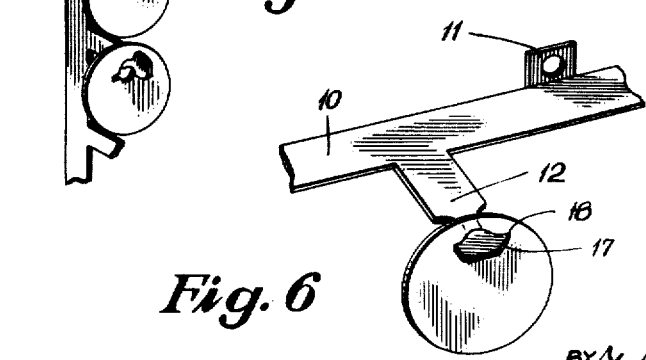
Fig. 6
INVENTOR
Louis TAVAN
ATTORNEYS

United States Patent Office 2,938,291
Patented May 31, 1960

2,938,291

DISPLAY DEVICE

Louis Tavan, 85 Rue Morin, Ste-Adele, Quebec, Canada

Filed Oct. 28, 1958, Ser. No. 770,120

2 Claims. (Cl. 40—138)

The present invention relates to a display device of the type comprising a plurality of projecting arms, and small reflecting plates which are freely suspended on the arms. The particular field of application of such devices is in outdoor advertizing signs, wherein the slightest breeze moves the reflecting plates, and provides an attractive shimmering effect and a pleasant metallic whisper.

Display devices of this type are already known, and various methods of assembling the plates to the arms have been proposed. One such method for example consists in providing flat sheet metal arms having opposed notches near their ends so as to provide generally T-shaped ends; the plates have eccentric round holes. To assemble the device, the legs of the T of the arm ends are bent towards each other, to permit insertion of the round holes, and are then bent back flat, to prevent accidental removal of the plates.

This and other methods of a similar nature are time consuming and cannot be carried out by automatic machines, so that the devices of conventional construction are rather expensive. It is the object of the present invention to provide a special construction which makes it possible to considerably reduce the assembly time of the display device, and thus to lower its cost.

According to the invention, one of the legs of the T-shaped ends of the arms has a rounded outer corner, which makes it possible to insert the plates thereon with a turning motion, without the necessity of bending the ends of the arms.

The size of the round hole of the plate may be such that a slight forcing is required. According to a further feature of the invention, however, it is preferable to provide very small notches at diametrically opposite points of the hole, to facilitate insertion of the plate on the arm.

An embodiment of the invention will now be described in detail, by way of example, in conjunction with the accompanying drawings, in which:

Fig. 1 is a general perspective view of the device after assembly;

Fig. 2 is a plan of a blank of the support and arms integral therewith;

Fig. 3 is a plan of one of the reflecting plates;

Figs. 4, 5 and 6 are perspective views showing the device before, during and after assembly, respectively; and Fig. 7 is an enlarged plan of the end of an arm, with a plate in cross section, at different stages of assembly.

Referring now to Figs. 1 and 2, the display device according to the invention comprises a support stamped out of sheet metal or other suitable sheet material, said support consisting of a strip 10 having a plurality of spaced, perforated, attachment lugs 11 and on the opposite side a plurality of spaced rectangular, arms 12. As shown in Fig. 1, the lugs 11 are bent at a right angle to the strip 11 and arms 12, so that when the device is attached to a wall, the arms 12 project outwardly at a right angle to the wall.

With reference to Fig. 3, each small reflecting plate 13 is of preferably round shape, and comprises an eccentric round hole 14, having two diametrically opposite notches 15. In the drawing the notches are enlarged for the sake of clarity, and in practice the width of each notch 15 should not be greater than the thickness of the sheet material out of which the plates 13 are made.

As illustrated in Fig. 7, the outer end of each arm 11 has two opposed semi-circular cut-outs 16', 16", so that each arm end has generally the shape of a T. The outer corner of one of the legs of the T is rounded, the curve 17 of said rounded portion beginning at the end point 18 of cut-out 16', and the radius of said curve 17 being the same as the minimum distance of said point 18 from the other cut-out 16". The centre of curve 17 is at point 19, which is the point of cut-out 16" closest to point 18. The radius of curve 17 corresponds essentially to the distance between the outer ends of notches 15 of hole 14 in plate 13, so that the plate can easily be forced past the curve 17 and inserted into its position 13' with a turning motion, as clearly shown in Fig. 7 and in Figs. 4–6. It will be seen that once the plate is inserted, it cannot accidentally fall out.

The construction above described makes possible a very rapid assembling method, which lends itself well to the use of automatic machinery, and, which, even by hand is much quicker than was possible hitherto.

The invention is not limited to the embodiment which has been illustrated and described, and many modifications thereof are possible. For example the notches 15 may be eliminated, in which case the radius of hole 14 should be slightly larger, to compensate for their absence. Whether the notches 15 are present or not, the radius of curve 17 may be a little larger than the distance of the outer ends of the notches 15 or the diameter of hole 14, so that slight forcing is required to insert the plates 13.

These and other such modifications are intended to be within the spirit and scope of the appended claims.

I claim:

1. A display device comprising a strip of thin material having along its outer edge a plurality of integral extending spaced rectangular arms, loosely mounted light reflector plates supported by said rectangular arms, transversely opposed semi-circular cut outs forming a narrowed section near the free end thereof for loosely supporting said light reflector plates, and twin reflector plate retaining lugs terminating each rectangular supporting arm; the outer corner of one of said twin retaining lugs being rounded, said rounded outer corner comprising a curved portion beginning at the outer end of one of said cut outs and centered at a point of the other cut out which is closest to said outer end point of said first mentioned cut out, each light reflector plate having an eccentric hole therein of a diameter smaller than the radius of said rounded outer corner, said round hole comprising diametrally opposed, generally rectangular notches of a width generally equal to the thickness of the thin material of the supporting arms, the maximum dimension from the bottom of one notch to the bottom of the diametrally opposed notch being slightly less than the radius of said rounded corner, whereby said light reflector plate can be irreversibly forced past said rounded outer corner with a turning motion and permanently and loosely mounted over said narrowed portion of said flat supporting arm.

2. A display device comprising a mounting strip of thin material having along one edge a series of longitudinally spaced support arms, each of which extends laterally from said strip and adjacent its free end is arcuately notched at laterally opposed points to provide a reflector plate supporting section of reduced lateral dimension terminating in a pair of oppositely laterally directed retaining lugs having a common axially facing outer edge, one end of which is reversely curved in an axial direction to form one lug having a convex edge portion of progressively decreasing axial dimension toward its tip; and a series of reflector plates each having a circular opening dimensioned to freely encompass said reflector plate supporting section of reduced lateral dimension and diametrically opposed outwardly directed slits, the opposed ends of which delimit a diametrical slot of lesser length than the combined lateral extension of said lugs but of greater length than the straight line distance between said convex edge portion of said one lug and the opposite arcuate notch whereby a respective reflector plate may be individually suspended on the supporting section of a respective support arm upon tilting of said respective reflector plate to dispose said diametrical slot in opposed parallel relation to said straight line distance and moving said plate onto said arm.

References Cited in the file of this patent

UNITED STATES PATENTS

| | | |
|---|---|---|
| 705,275 | Mosher et al. | July 22, 1902 |
| 2,795,070 | Touche | June 11, 1957 |

FOREIGN PATENTS

| | | |
|---|---|---|
| 538,193 | Italy | Jan. 18, 1956 |